United States Patent
Snover (10) Patent No.: US 7,530,075 B2
(45) Date of Patent: *May 5, 2009

(54) SYSTEM AND METHOD FOR EMPLOYING OBJECT-BASED PIPELINES

(75) Inventor: Jeffrey P. Snover, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 1076 days.

This patent is subject to a terminal disclaimer.

(21) Appl. No.: 10/882,419

(22) Filed: Jun. 30, 2004

(65) Prior Publication Data

US 2004/0243543 A1 Dec. 2, 2004

Related U.S. Application Data

(63) Continuation of application No. 10/438,235, filed on May 12, 2003.

(51) Int. Cl.
G06F 9/54 (2006.01)
G06F 17/00 (2006.01)

(52) U.S. Cl. ...................... 719/313; 707/104
(58) Field of Classification Search ................. 719/313; 707/104

See application file for complete search history.

(56) References Cited

U.S. PATENT DOCUMENTS

| | | | |
|---|---|---|---|
| 5,404,528 A | 4/1995 | Mahajan | |
| 5,826,088 A | 10/1998 | Sitbon et al. | |
| 6,718,371 B1 * | 4/2004 | Lowry et al. | 709/213 |
| 6,721,808 B1 | 4/2004 | Singh | |
| 6,782,531 B2 | 8/2004 | Young | |
| 6,785,685 B2 * | 8/2004 | Soetarman et al. | 707/101 |
| 7,055,095 B1 | 5/2006 | Anwar | |
| 7,216,351 B1 | 5/2007 | Maes | |
| 2001/0052030 A1 | 12/2001 | Shiraishi | |
| 2003/0149722 A1 | 8/2003 | Jolley et al. | |
| 2004/0024897 A1 | 2/2004 | Ladd et al. | |

(Continued)

FOREIGN PATENT DOCUMENTS

WO WO0029942 5/2000

OTHER PUBLICATIONS

Microsoft Computer Dictionary Fifth Edition, Microsoft Press.*

(Continued)

*Primary Examiner*—Meng-Ai An
*Assistant Examiner*—Abdou K Seye
(74) *Attorney, Agent, or Firm*—Lee & Hayes, PLLC (57) ABSTRACT

The present invention is directed at a computing environment and method that supports object-based pipelines. The computing environment includes a runtime shell, a parser, and base commands. The runtime shell receives an object-based pipeline (e.g., via a command line). The runtime shell sends the object-based pipeline to the parser that parses the object-based pipeline into pipeline sub-components. Each of the pipeline sub-components are associated with a command, such as a base command provided by an operating system or a third party command provided by a third party developer. The parser invokes a method that is associated with the first pipeline sub-component. The method obtains objects of interest from a specified input (e.g., XML). The objects are sent to subsequent pipeline sub-components for further processing. The objects do not have methods. The pipeline sub-components may execute in the same process.

31 Claims, 7 Drawing Sheets

U.S. PATENT DOCUMENTS

2004/0049535 A1    3/2004   Volkov et al.
2004/0143599 A1*   7/2004   Shalabi et al. ........... 707/104.1
2006/0143267 A1    6/2006   Smithline et al.
2007/0214271 A1    9/2007   Griffin et al.

OTHER PUBLICATIONS

Foreign Office Action for Application No. 200410043488.2, dated Dec. 1, 2006, 22 pages.

Kernighan et al, "The UNIX Programming Environment", Dec. 31, 1999, 11 pages.

UNIX System V Programming Lecture No. 10, Pipe Communication, Mar. 31, 1994, 6 pages.

MacDonald et al., "Rethinking the Pipeline as Object-Oriented States with Transformations," IEEE Apr. 26, 2004 pp. 12-21.

Rose et al., "The OPUS Pipeline: A Partially Object-Oriented Pipeline System, Astronomical Society of the Pacific," vol. 77, 1995 pp. 429-432.

Doyle, et al., "Microsoft Window NT Workstation Version 4.0", Comprehensive Resource Guide and Utilities for Windows NT Workstation, Microsoft Press, 1996, pp. 939.

Malloy et al., "Applying Software Engineering Techniques to Parser Design: The Development of a C# Parser", Proceedings of SAICSIT 2002, pp. 75-82.

Eckel, "Thinking in Java", Prentiss Hall, Sep. 2002, pp. 488, 490 and 492.

English translation of "Notice of Second Office Action" from the China Patent Office of the State of the Intellectual Property Office for Application No. 200410043488.2 mailed on Aug. 3, 2007, 8 pgs.

* cited by examiner

SYSTEM AND METHOD FOR EMPLOYING OBJECT-BASED PIPELINES

RELATED APPLICATIONS

This is a continuation of U.S. patent application Ser. No. 10/438,235, filed May 12, 2003.

BACKGROUND OF THE INVENTION

Many operating systems provide a mechanism for "stitching" (i.e., pipelining) multiple applications (e.g., utilities) together to create a custom, ad hoc command that can be entered on a command line of the operating system. Typically, the commands are used in system administration tools, such as for managing system properties. Each of the "pipelined" utilities in the command communicate with each other by transferring text. Thus, each utility in the pipeline is responsible for parsing text that is received and for formatting text that is output. As one can imagine, if a very sophisticated command is desired, a system administrator must understand several utilities in order to properly pipeline the utilities in a manner that will produce the sophisticated output. Understanding the detailed inner-workings of each utility and correctly pipelining the several utilities is time-consuming and is challenging for system administrators. In fact, few people acquire such detailed knowledge of each of the utilities. Thus, system administration is very specialized. Therefore, there is a need for a mechanism that allows system administrators the ability to create custom, ad hoc, command-line-based administration tools without requiring them to know the detailed workings of each utility that is pipelined.

SUMMARY OF THE INVENTION

The present invention is directed at a computing environment and method that supports object-based pipelines. The computing environment includes a runtime shell, a parser, and base commands. The runtime shell receives an object-based pipeline (e.g., via a command line). The runtime shell sends the object-based pipeline to the parser that parses the object-based pipeline into pipeline sub-components. The pipeline sub-components may be associated with one of the base commands provided by an operating system, a third party command written by a third party developer, or the like. The parser invokes a method that is associated with the first pipeline sub-component. The method obtains objects of interest from a specified input (e.g., XML). The objects are sent to subsequent pipeline sub-components for further processing. Each of the pipeline sub-components may execute in the same process.

DETAILED DESCRIPTION OF THE PREFERRED EMBODIMENT

Briefly stated, the present invention is directed at an environment that supports object-based pipelines and a mechanism for creating and processing object-based pipelines. As will become apparent after reading the following detailed description, the present invention minimizes the amount of code that third party developers need to write and minimizes the amount of knowledge that system administrators need to know in order to manage system properties. Therefore, the present invention significantly simplifies system administrative tasks.

Figure 1:
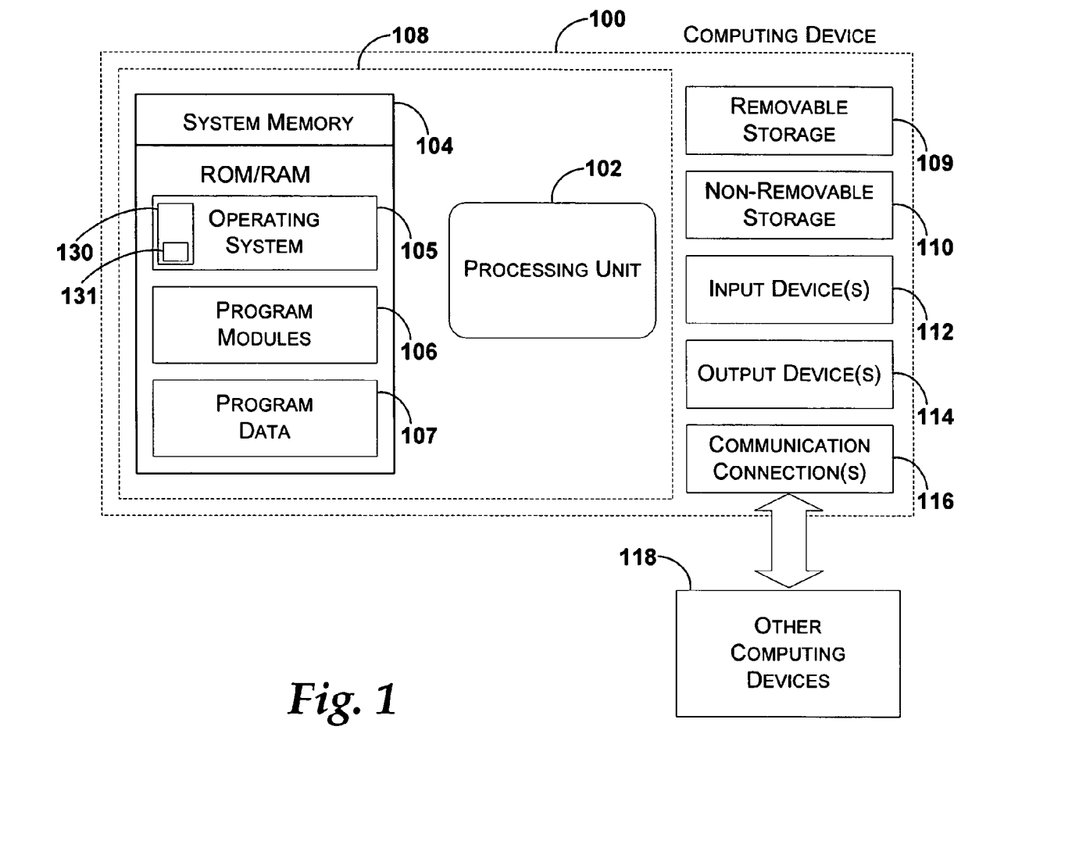
FIG. 1 illustrates an exemplary computing device that may be used in one exemplary embodiment of the present invention.

FIG. 1 illustrates an exemplary computing device that may be used in one exemplary embodiment of the present invention. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more program modules 106, and may include program data 107. The operating system 105 includes a command processor 130 that executes operating system commands. The command processor 130 includes a shell 131 (i.e., the command processor interface) that accepts the operating system commands. The shell may display a command prompt, may display a graphical user interface, or any other means for inputting and interpreting user input. The shell 131 verifies that the entered commands are valid and sends the verified commands onto another part of the command processor 130 for execution. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well know in the art and need not be discussed at length here.

Computing device 100 may also contain communication connections 116 that allow the device to communicate with other computing devices 118, such as over a network. Communication connections 116 are one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
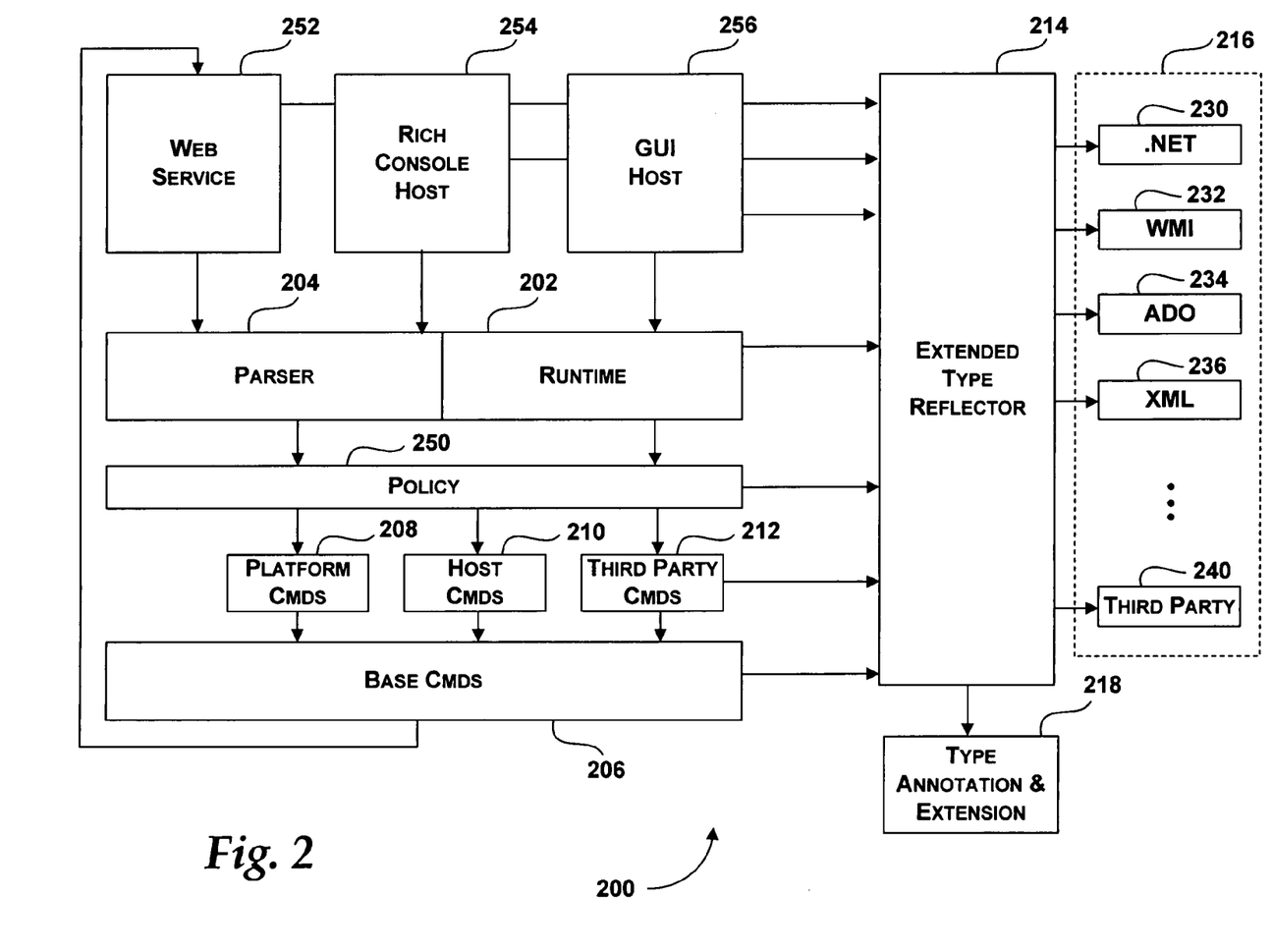
FIG. 2 is a block diagram generally illustrating an overview of one embodiment of an administrative tool environment in which the present invention may operate.
Figure 3:
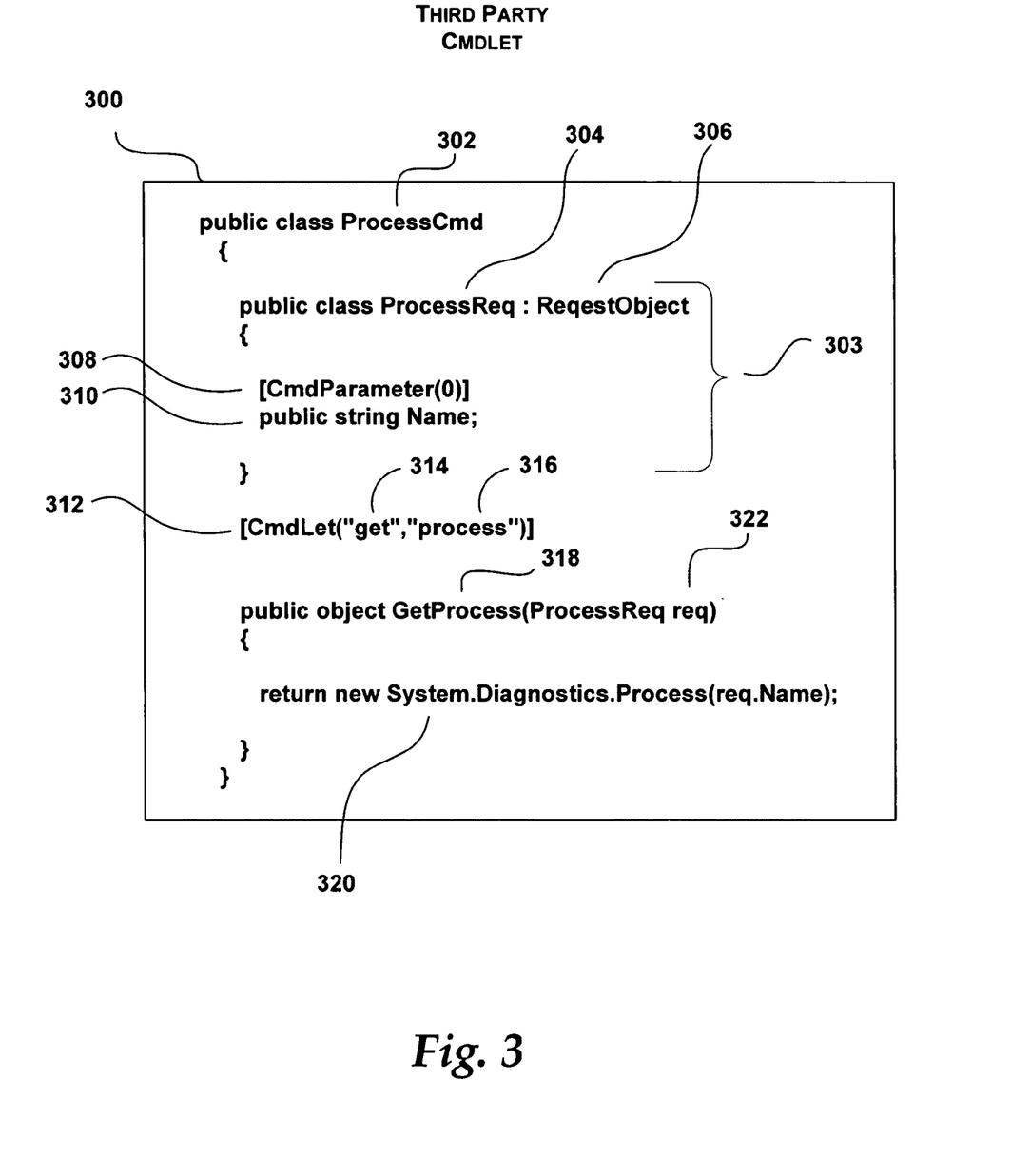
FIG. 3 is one embodiment of a third party command that will operate in the administrative tool environment shown in FIG. 2.

FIG. 2 is a block diagram generally illustrating an overview of one embodiment of an administrative tool environment in which the present invention may operate. The administrative tool environment 200 includes a runtime shell 202, a parser 204, and base commands 206. The runtime shell 202, parser 204, and base commands 206 may be part of operating system 105 shown in FIG. 1. The administrative tool environment 200 may also include platform commands 208, host commands 210, and one or more third party commands 212. The platform commands 208 and host commands 210 are commands unique to the type of computer on which the administrative tool environment 200 is hosted and specific to the host, respectively. The third party commands 212, described in detail later in conjunction with FIG. 3, are supplied by third party developers and are, typically, directed at managing system or third party application properties. As will be described in detail, the administrative tool environment 200 of the present invention allows system administrators to manage the system properties without requiring detailed understanding of all of the base commands 206, host commands 210, and platform commands 208. Rather, the administrative tool environment 200 allows system administrators the ability to create third party commands 212 with relatively little code. As will be described later, even though the third party commands 212 have relatively little code, the commands 212 may be easily pipelined with other commands to provide sophisticated administrative capabilities and tools.

Figure 7:
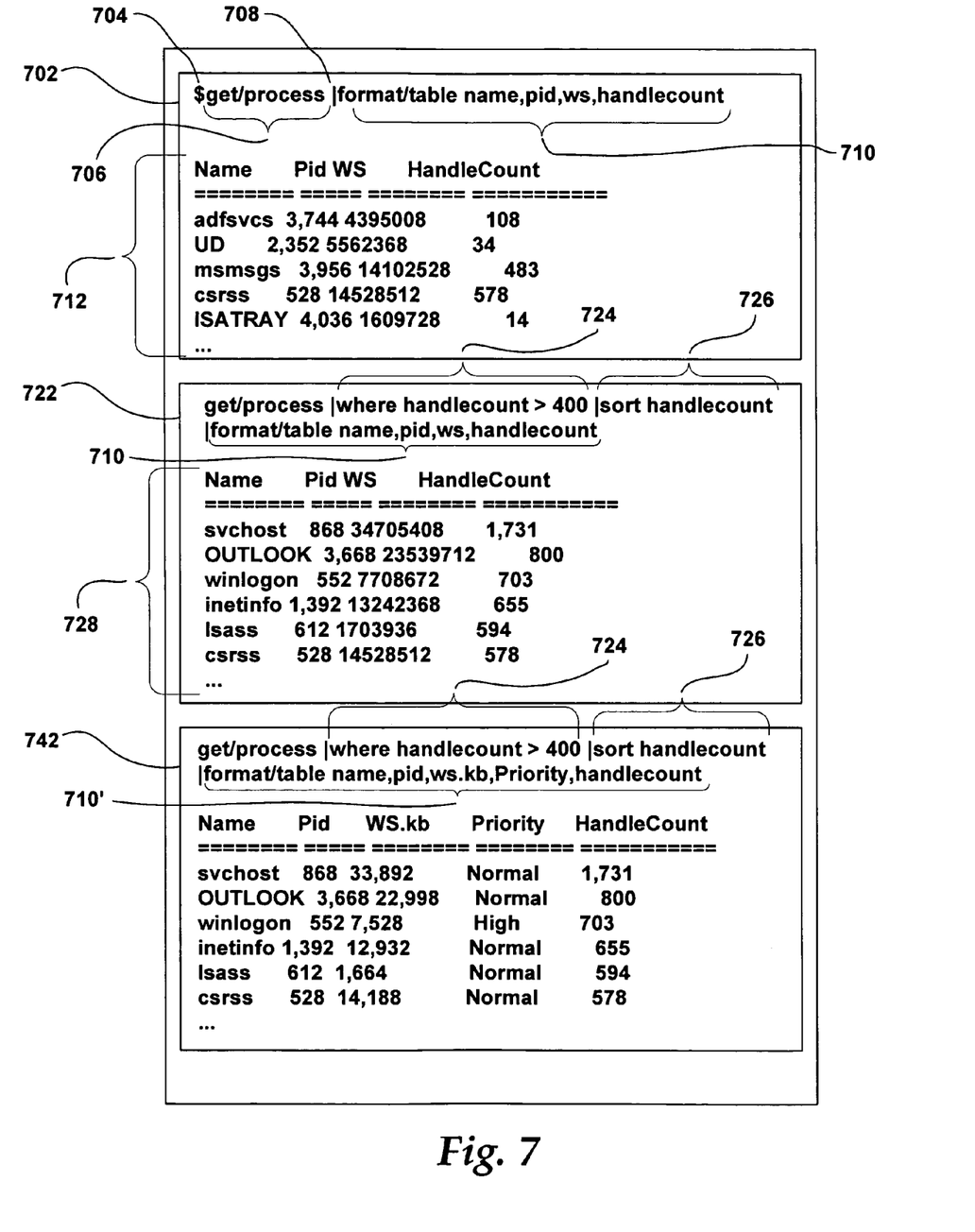
FIG. 7 illustrates several exemplary object-based pipelines and each of their respective outputs.

Now, before describing the exemplary administrative tool environment 200 in further detail, an exemplary object-based pipeline, illustrated in FIG. 7, is discussed. FIG. 7 illustrates three exemplary object-based pipelines 702, 722, and 742. Object-based pipeline 702 includes a command prompt 704, a pipeline character 708, and pipeline sub-components 706 and 710. In general, each pipeline sub-component may be a platform command, a host command, a third party command, a base command, or the like. As will be described below, each of these types of commands are created using the same mechanisms and operate in the same manner. In FIG. 7, the first pipeline sub-component 706 represents a third party command. However, as mentioned above, the first pipeline sub-component 706 may be a platform command, a host command, or a base command. The command prompt 704 may be any indicator, such as a dollar sign "$" as shown. The pipeline character 708 separates each of the pipeline sub-components 706 and 710. The pipeline character 708 may take one of many forms, but is typically represented with a line "|". The object-based pipeline 702 may have any number of pipeline components, each separated with the pipeline character 708. Typically, the last pipeline sub-component (e.g., sub-component 710) may be responsible for outputting information, such as text on the display. The pipeline sub-components 706 and 710 may take parameters, such as shown with pipeline subcomponent 710, or may not need parameters, such as shown with pipeline subcomponent 706. Each pipeline sub-component 706 and 710 represents a verb/noun pair, such as "get/process" and "format/table". The verb or the noun may be implicit in the pipeline sub-components 706 and 710.

While object-based pipeline 702 illustrated in FIG. 7 may appear syntactically similar to text-based pipelines, the underlying mechanisms for pipelining and for executing the object-based pipeline 702 are considerably different. For example, in text-based pipelines, each pipelined command is a separate utility and is thus a stand-alone executable program. In addition, each separate utility outputs text and each utility must interpret the text before performing unique processing on the text. In contrast, in accordance with the present invention, the pipeline sub-components 706 and 710 exchange objects (e.g., collection of objects) between each other. In one embodiment, the objects are batched to each subsequent pipeline sub-component 706 and 710 so that processing may be completed in the prior sub-component before the subsequent sub-component begins processing on the objects. In another embodiment, the objects may be streamed to multiple pipeline sub-components so that processing on the objects may be performed in parallel. In another embodiment, one or more of the pipeline sub-components may run in the same process. A pipeline sub-component, and therefore, the objects between sub-components, may come from a different system.

Returning to FIG. 2, the runtime shell 202 accepts operating system commands (e.g., object-based pipelines). These operating system commands may be input through a rich console host 254, a graphical user-interface (GUI) host 256, or a third party host (not shown). Once the runtime shell 202 receives an operating system command, the runtime shell 202 verifies that the operating system command is valid. If the verified command is an object-based pipeline, the runtime shell 202 forwards the command to parser 204. Briefly, the parser 204 parses the object-based pipeline into pipeline sub-components. The parser 204 then invokes a method associated with the first pipeline sub-component. The method creates one or more objects, which may be used in processing by each of the subsequent pipeline sub-components identified by parser 204. Typically, the last pipeline sub-component outputs information, such as text for a console-based host.

The administrative tool environment 200 may further include an extended type reflector 214 that is configured to access precisely parseable input 216. The runtime shell 202, third party commands 212, base commands 206, rich console host 254, and GUI host 256 may each access the precisely parseable input 216 through the extended type reflector 214. In the following discussion, precisely parseable input 216 is defined as input in which properties and values may be discerned. Some exemplary precisely parseable input 216 include Windows Management Instrumentation (WMI) input 232, ActiveX Data Objects (ADO) input 234, extensible Markup Language (XML) input 236, and object input, such as .NET objects. Other precisely parseable input may include third party data formats 240.

In general, the extended type reflector 214 supports reflection-based processing. Reflection-based processing refers to a mechanism whereby executable code accesses properties of objects without needing to understand the specifics of the objects. The objects themselves will inform the requesting executable code what properties they have and the associated values. This allows the executable code to be independent of the objects. In addition, in accordance with the present invention, the extended type reflector 214 provides reflection for non-object type input, such as ADO input 234 and the like. For example, assuming the precisely parseable input 216 is an ADO input 234, if the executable code queried the ADO input for properties, the ADO input 234 would return two properties: a column property and a row property. However, these two properties do not provide sufficient detail regarding the "objects" within the ADO input 234. Thus, in accordance with the present invention, the extended type reflector 214 recognizes that the executable code queried an ADO input 234 and will query the ADO input 234 for the column names, rather than its properties. In response, the ADO input 234 will return the column names, which are returned to the executable code as the properties. Thus, the extended type reflector 214 is configured to create "objects" from any type of precisely parseable input 216.

In order to create objects from precisely parseable input 216, the administrative tool environment 200 further includes a type annotation and extension catalog 218. The type annotation and extension catalog 218 describes how the extended type reflector 214 should query various types of input 216 to obtain the desired properties for creating the objects for a specific input type. Thus, the extended type reflector 214 provides a layer of indirection that allows reflection on all types of objects. For example, if the input type is XML, a description file describing the XML is used to create the objects from the XML document.

The administrative tool environment 200 may further include a policy engine 250 and a web service 252. The parser 204 and runtime shell 202 may communicate through the policy engine 250 when invoking any of the commands, such as platform commands 208, host commands 210, and third party commands 212. The web service 252 allows the administrative tool environment 200 to operate over a network. The web service 252 communicates with the parser 204, runtime shell 202, and the extended type reflector 214. In addition, the base commands 206 may be accessed through web service 252.

FIG. 3 is one embodiment for creating a pipeline sub-component (i.e., a cmdlet). When completed, the cmdlet may be a platform command, a host command, a third party command, or a base command. The following discussion describes the creation of a third party command that may be written by a third party developer. The third party command will operate in the administrative tool environment shown in FIG. 2. The third party command 300 includes a command class 302, such as ProcessCmd class, that is a public class. The command class 302 includes a grammar mechanism 303 for defining a grammar for expected input parameters, a static method 318, and a command attribute 312 for associating the cmdlet (i.e., "get/process") with the static method 318.

In one embodiment, the grammar mechanism includes an input parameter class 304, such as ProcessReq class. The input parameter class 304 derives from a RequestObject class 306 that is provided by the administrative tool environment to process the parameters entered for the command (e.g., via a command line) in accordance with expected parameters defined within the input parameter class 304. The input parameter class 304 includes one or more member declarations 310. The member declarations 310 correspond to one of the expected input parameters for the third party command. The input parameter class 306 may also include one or more directives 308 associated with one of the member declarations 310. In the input parameter class 304 shown in FIG. 3, the directive 308 identifies "Name" as the first expected parameter in the object-based pipeline command. Once the processing of the input parameters is completed, the input parameters are supplied to the static method 318 as a parameter 322. The static method 318 may then perform processing using the expected parameters (e.g., "req.Name"). Additional information on this grammar mechanism 303 may be obtained from the commonly assigned, patent application entitled "Reflection-based Processing of Input Parameters for Commands", U.S. application Ser. No. 10/438,234, which is hereby incorporated by reference.

The command attribute 312 identifies text parameters 314 and 316 that will appear in the object-based pipeline associated with third party command 300. Briefly, parser 204 (FIG. 2) will recognize text parameters 314 and 316 when parsing the object-based pipeline command. Upon recognizing text parameters 314 and 316, parser 304 will locate static method 318 and invoke static method 318. Processing within static method 318 is responsible for creating the object or collection of objects that will be passed between the pipeline sub-components. The static method 318 may call system methods provided by the operating system, such as System.Diagnostics.Process 320 shown in FIG. 3, may call third party code, and the like.

Figure 4:
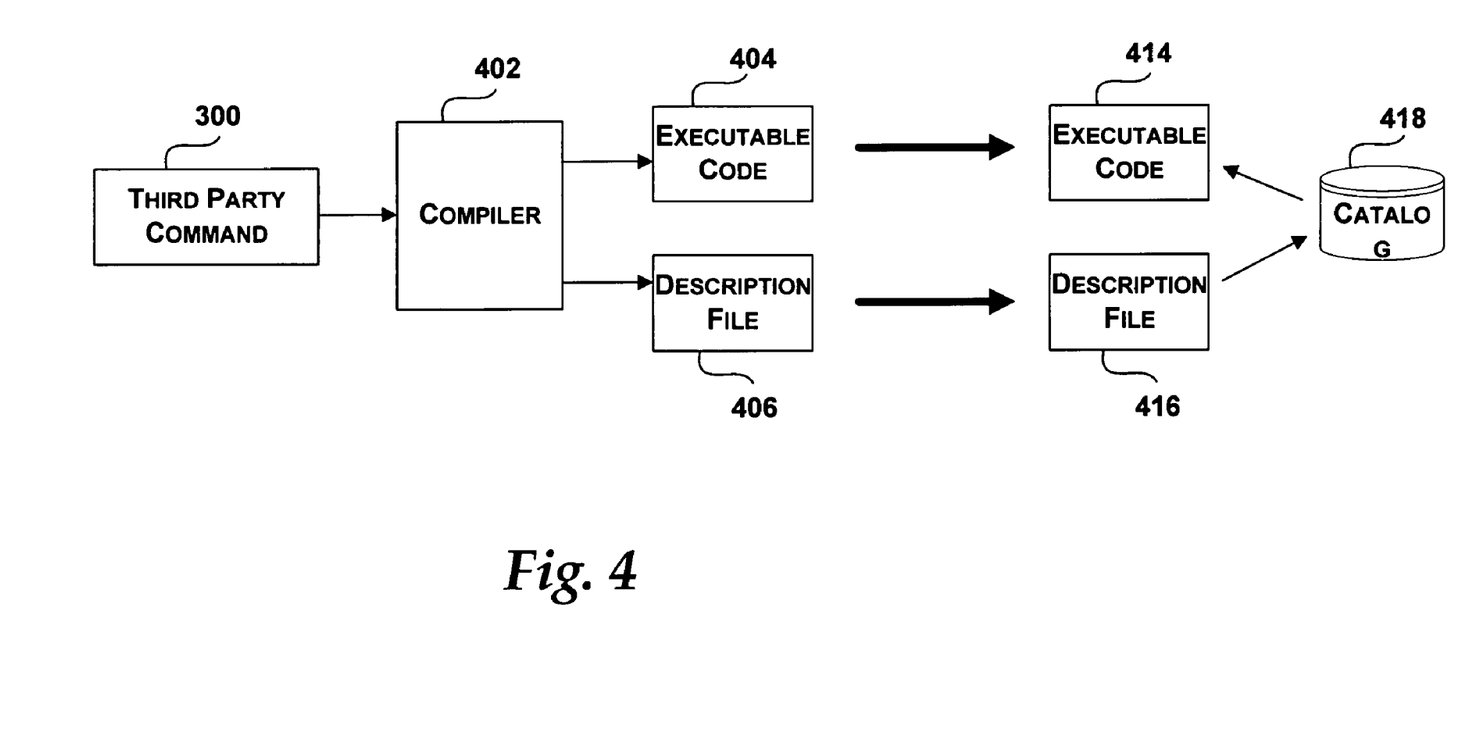
FIG. 4 is a block diagram illustrating the installation of the third party command shown in FIG. 3 on a computing device shown in FIG. 1.

FIG. 4 is a block diagram illustrating the installation of the third party command shown in FIG. 3 on a computing device shown in FIG. 1. As mentioned above, the installation of third party commands is similar in nature to the installation of platform commands, host commands, and base commands. Once the third party command 300 has been coded, the third party command 300 is input into a compiler 402 for compilation. Compiler 402 outputs executable code 404 and a description file 406. When a system administrator wants the third party command 300 installed on a specific computing device, the executable code 404 and description file 406 are downloaded (represented by arrows) to the specific computing device (not shown). Typically, the specific computing device is different than the computing device on which the third party command is developed. When the executable code 404 and description file 406 are downloaded, information about the third party command is stored in a catalog 418. The information identifies a location for retrieving the executable code 414 associated with the text parameters 314 and 316 shown in FIG. 3 as well as other data important to executing the third party command. Then, the operating system on the specific computing device will recognize the text parameters 314 and 316 and invoke the static method 318 as identified within catalog 418.

Figure 5:
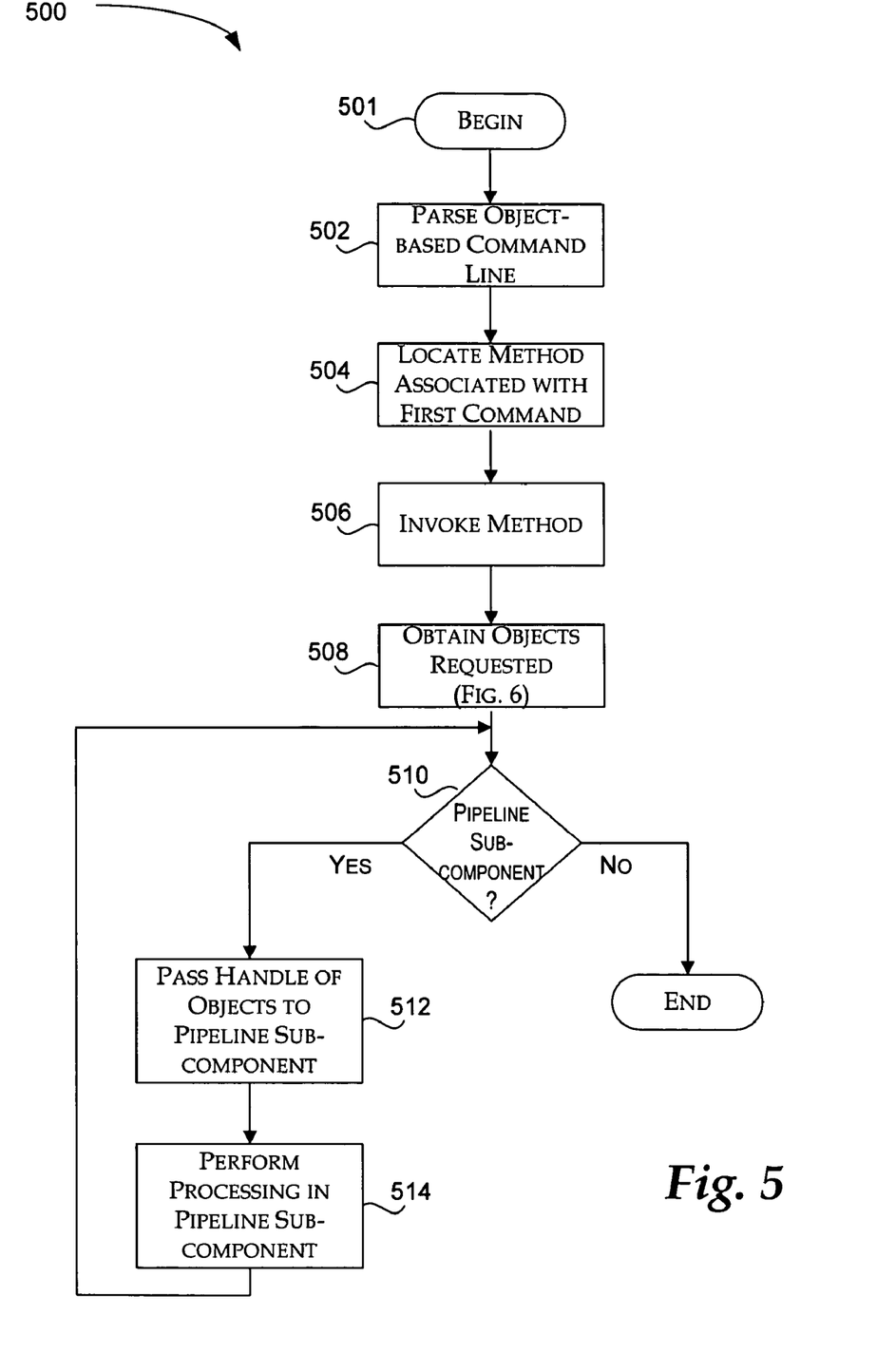
FIG. 5 is a logical flow diagram illustrating a process for executing an object-based pipeline in accordance with the present invention.

FIG. 5 is a logical flow diagram illustrating a process for executing an object-based pipeline in accordance with the present invention. The process begins once the runtime shell recognizes an object-based pipeline entered on the command line. Processing continues at block 502.

At block 502, the object-based pipeline is parsed to identify one or more pipelined sub-components and their associated input parameters. The aforementioned patent application entitled "Reflection-based Processing of Input Parameters for Commands" describes one embodiment for parsing the object-based pipeline. Once the object-based pipeline is parsed, processing continues at block 504.

At block 504, the parser identifies the method associated with the first pipelined sub-component. In one embodiment, this identification is performed by looking up the text parameters within the catalog. The catalog then provides the location for the associated method. Processing continues at block 506.

At block 506, the identified method is invoked (e.g., Get-Process method 318 shown in FIG. 3). At block 508, the method obtains the objects that will be passed to the next pipeline sub-component. In some cases, obtaining the objects involves obtaining the objects directly. This occurs when the information is already in an object form, such as .NET objects. In other cases, as will be described in conjunction with FIG. 6, obtaining the objects involves building the objects from one of several input types. Once the object or objects are obtained, processing continues at decision block 510.

At decision block 510, a determination is made whether the object-based pipeline includes another pipeline sub-component. As described above in conjunction with FIG. 7, the object-based pipeline may include several pipeline sub-components. As long as there is another pipeline sub-component, processing continues to block 512.

At block 512, a reference (e.g., handle) of the objects is passed to the next pipeline sub-component. In another embodiment, the reference of the objects may be streamed to multiple pipeline sub-components for parallel processing of the objects. Because the objects are created to support reflection, each object will inform the subsequent pipeline sub-component as to what properties they have and the associated values. Processing continues at block 514.

At block 514, the subsequent pipeline sub-component performs processing on the objects. The subsequent pipeline sub-components may create a subset of the objects, order the objects, or perform other processing on the objects created in block 508. For example, the sub-component may display a graph of information that the system administrator may use to select properties for output. Once the sub-component performs its processing, processing proceeds back to decision block 510. If there is another pipeline sub-component, processing in blocks 512 and 514 is performed for this other pipeline sub-component. Typically, the last pipeline sub-component will output information regarding the objects, such as text. After each of the pipeline sub-components have performed their respective processing, processing is complete and continues to the end.

Figure 6:
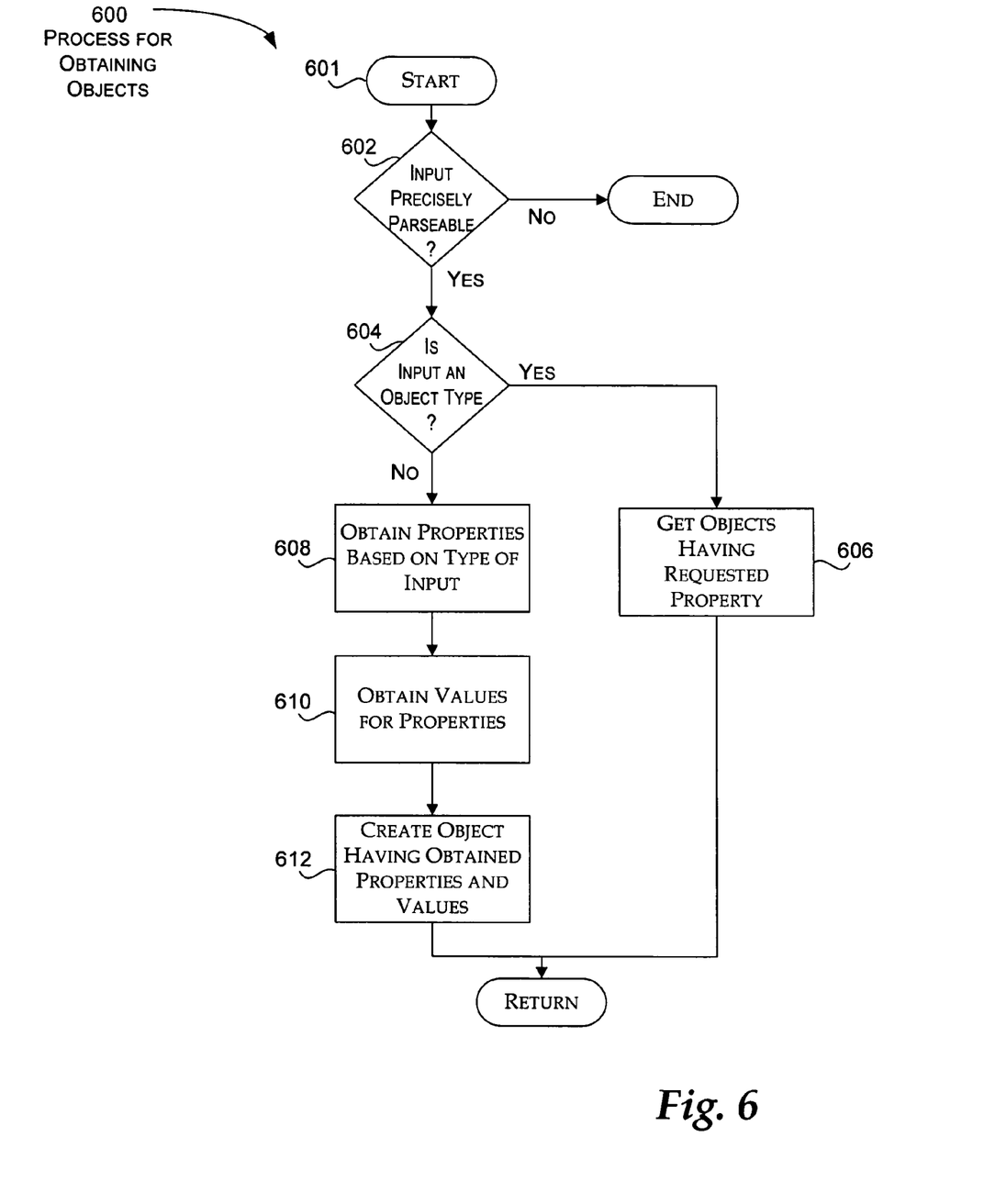
FIG. 6 is a logical flow diagram illustrating a process for obtaining objects suitable for use in FIG. 5.

FIG. 6 is a logical flow diagram illustrating a process for obtaining the objects suitable for use in FIG. 5. Processing begin at block 601 and continues to decision block 602. At decision block 602, a determination is made whether the input requested by the method is precisely parseable. As described above, the object information may be obtained from objects, such as NET objects, from Windows Management Instrumentation (WMI) input, from ActiveX Data Objects (ADO) input, from eXtensible Markup Language (XML) input, and from other third party formats. If the determination at block 602 concludes that the input is not precisely parseable, the input is not valid. Thus, there is an error and the object-based pipeline will not be processed. Processing continues to the end.

Returning to decision block 602, if the determination concludes that the input is precisely parseable, processing continues to decision block 604. At decision block 604, a determination is made whether the input is an object type, such as a NET object. If the input is already in an object format, processing continues to block 606.

At block 606, objects having the requested properties are retrieved. Reflection may be used to obtain these requested properties. Once all the objects are obtained, processing continues to return block and back to FIG. 5.

On the other hand, if the determination at decision block 604 concludes that the input is not an object type, processing continues to block 608. At block 608, properties for the objects are obtained based on the type of input. The extended type reflector, in conjunction with the type annotation and extensions, are used to obtain the properties from the input. The type annotation and extensions describe the format of the input so that the properties may be obtained. Once the properties are obtained, processing continues at block 610.

At block 610, values for the properties obtained in block 610 are obtained. Those skilled in the art will appreciate that the property and value may be obtained for each requested property before obtaining the next property. Thus, the processing blocks may be performed in various orders to achieve the overall desired outcome. Once the properties and their corresponding values have been obtained, processing continues at block 612.

At block 612, an object is created having the obtained properties and values. The object is created in a manner that will itself support reflection. Processing then continues to the return block and back to FIG. 5.

Referring to FIG. 7 again, the three exemplary object-based pipelines 702, 722, and 742 are discussed in further detail. Object-based pipeline 702 has two pipeline sub-component 706 and 710. Pipeline sub-component 710 outputs text 712 to the display. The pipeline sub-component 710 includes a base command, "format\table", that accepts formatting parameters (e.g., name, pid, ws, handlecount) that specify the arrangement of the output. Thus, text 712 is a table having a first row with the names of the properties and subsequent rows each having values for the properties for one of the objects that were obtained during processing through the object-based pipeline 702.

In the second example, object-based pipeline 722 includes the two pipeline sub-components 706 and 710. In addition, there are two additional pipeline sub-components (i.e., pipeline sub-components 724 and 726) that precede pipeline sub-component 710. Pipeline sub-component 724 creates a subset of the objects returned by the first pipeline sub-component 706. Pipeline sub-component 726 rearranges the order of the subset. Again, pipeline sub-component 710 outputs the text (i.e., text 728).

In the third example, object-based pipeline 742 includes the pipeline sub-components 724 and 726, but modifies pipeline sub-component 710 (hereinafter referred to as modified pipeline sub-component 710'). Modified pipeline sub-component 710' adds an attribute to one of the parameters on the command line, which modifies the output of that parameter in the table. The working set (ws) parameter is now ws.kb meaning the working set will be displayed in kilobytes. Because in one embodiment of the present invention, the objects themselves include objects, the present invention may utilize this sophistication when pipelining sub-components. For example, an administrator may "navigate" to sub-properties of the objects for outputting or processing. The syntax on the command line will change accordingly, such as adding a "." between the object and the sub-property of the object.

Many other examples may easily be created, such as sorting alphabetically on the name and creating a subset of objects where each object has a working set of at least 12,000K. These and other variations are easily entered on the command line without requiring the system administrator to know the details of the base commands (e.g., where, sort, and format). Therefore, the present invention greatly reduces the complexity of system administration.

The above specification, examples and data provide a complete description of the manufacture and use of the composition of the invention. Since many embodiments of the invention can be made without departing from the spirit and scope of the invention, the invention resides in the claims hereinafter appended.

I claim:

1. A computer-readable storage having computer executable instructions for employing pipelines, the instructions when executed by a computer comprise:
   receiving an object-based pipeline;
   parsing the object-based pipeline into a plurality of pipeline sub-components;
   identifying which one method of a plurality of methods is associated with a first pipeline sub-component of the plurality of pipeline sub-components by identifying parameters of the first pipeline subcomponent in a catalog;
   invoking the identified method associated with the a first pipeline sub-component, the method creating at least one object of interest to the first pipeline sub-component, the at least one object of interest excluding executable instructions;
   sending the at least one object of interest to a next pipeline sub-component for processing, the next pipeline sub-component being one of the plurality of pipeline sub-components; and
   processing the at least one object of interest with the next pipeline sub-component.

2. The computer-readable storage of claim 1, wherein receiving the object-based pipeline is via a command line.

3. The computer-readable storage of claim 1, wherein the first pipeline sub-component corresponds to a base command provided by an operating system.

4. The computer-readable storage of claim 1, wherein the first pipeline sub-component corresponds to a third party command.

5. The computer-readable storage of claim 1, wherein sending the at least one object to the next pipeline sub-component includes sending a handle for each of the at least one object to the next pipeline sub-component.

6. The computer-readable medium of claim 1, wherein sending the at least one object includes sending the at least one object to multiple pipeline sub-components.

7. The computer-readable storage of claim 1, wherein creating the plurality of objects includes obtaining property names for the object through reflection.

8. The computer-readable medium of claim 1, wherein creating the plurality of objects is based on information from an input source.

9. The computer-readable storage of claim 8, wherein the input source includes an XML-based document.

10. A computer-readable storage encoded with a data structure supporting object-based pipelines, the data structure comprising:
    an input parameter structure readable by a processor for specifying processing of at least one expected parameter for a command, the at least one expected parameter being supplied when the command is invoked, the input parameter structure operable to identify which one static method of a plurality of static methods is associated with the first pipeline sub-component of a plurality of pipeline sub-components by identifying the input parameter structure of the first pipeline subcomponent in a catalog;
    the static method when executed by the processor generating at least one object and providing the at least one object to a next command in the object-based pipeline, the at least one object exclusive of a command; and
    a command attribute, when read by the processor, to associate the static method with an input, the input being supplied to invoke the command.

11. The computer-readable storage of claim 10, wherein the input includes a command line.

12. The computer-readable storage of claim 10, further comprising instructions which then execute a method comprising passing information within the parameter structure to the static method.

13. A computer-implemented method for communicating between pipelined commands, the method when executed by a computer comprises:
    receiving an object-based pipeline;
    parsing the object-based pipeline into a plurality of pipeline commands;
    identifying at least one method of a plurality of methods associated with a first pipelined command of the plurality of pipeline commands, the method being identified by identifying parameters of the first pipeline command in a catalog, the at least one parameter excluding command instruction;
    invoking the identified method associated with the first pipeline command, the method creating at least one object of interest to the first pipeline command, the at least one object of interest excluding executable instructions;
    creating at least one object with the identified method;
    sending a reference to the at least one object from the first pipelined command to a second pipelined command;
    identifying a second method associated with the second pipeline command; and
    performing processing on the at least one object by the second pipelined command with the second method.

14. The computer-implemented method of claim 13, wherein the first pipelined command is a third party command provided by a third party developer.

15. The computer-implemented method of claim 13, wherein the first pipelined command is a base command provided by an operating system.

16. The computer-implemented method of claim 13, wherein the first and second pipelined command execute in a same process.

17. The computer-implemented method of claim 13, further comprising sending the reference to the at least one object to a third pipelined command for parallel processing.

18. The computer-implemented method of claim 13, wherein the second pipelined command sends a subset of the at least one object to a third pipelined command.

19. A system that processes pipelined commands, the system comprising:
    a processor; and
    a memory, the memory being allocated for a plurality of computer-executable instructions which are loaded into the memory for execution by the processor, the computer-executable instructions performing a method comprising:
    in response to receiving a pipelined command, parsing the pipelined command into a plurality of pipeline sub-components;
    identifying which one method of a plurality of methods is associated with a first pipeline sub-component of the plurality of pipeline sub-components by identifying parameters of the first pipeline subcomponent in at catalog;
    invoking the identified method associated with the first pipeline sub-component, the method creating at least one object of interest, the at least one object exclusive of executable instructions;
    sending the at least one object of interest to a next pipeline sub-component for processing; and
    processing the at least one object of interest with the next pipeline sub-component.

20. The system of claim 19, wherein the first pipeline sub-component corresponds to a base command provided by an operating system.

21. The system of claim 19, wherein the first pipeline subcomponent corresponds to a third party command.

22. The system of claim 19, wherein the pipelined command is received through a command line.

23. The system of claim 19, wherein sending the at least one object to the next pipeline sub-component includes sending a handle for each object to the next pipeline sub-component.

24. A computing device for communicating between pipelined commands, the computing device comprising:
   means for receiving an object-based pipeline;
   means for parsing the object-based pipeline into a plurality of pipeline commands;
   means for identifying at least one method of a plurality of methods associated with a first pipelined command of the plurality of pipeline commands, the method being identified by identifying parameters of the first pipeline command in a catalog, the at least one parameter excluding command instruction;
   means for invoking the identified method associated with the first pipeline command, the method creating at least one object of interest to the first pipeline command, the at least one object of interest excluding executable instructions;
   means for creating at least one object with the identified method;
   means for sending a reference to the at least one object from the first pipelined command to a second pipelined command;
   means for identifying a second method associated with the second pipeline command; and
   means for performing processing on the at least one object by the second pipelined command with the second method.

25. The computing device of claim 24, wherein the first and second pipelined command are entered through a command line.

26. A computer-readable storage device having computer-executable instructions, the instructions when executed by a computer performing a method comprising:
   receiving a pipeline of commands, at least one command being capable of receiving at least one input object and outputting at least one output object;
   identifying a method associated with a first pipeline command in a catalog by identifying parameters of one of the first pipeline of commands in a catalogue,
   executing one of the commands in the pipeline using the identified method associated with the first pipeline command to create a precisely parseable output while executing the one command using the identified method, the precisely parseable output being in a non-object format;
   passing the precisely parseable output to a subsequent command in the pipeline, wherein the subsequent command and the one command execute in different processes on a same computing system; and
   executing the subsequent command in the pipeline with the precisely parseable output.

27. The computer-readable storage device of claim 26 wherein the subsequent command and the one command execute on different computing systems.

28. The computer-readable storage device of claim 26 wherein the precisely parseable output comprises an XML document.

29. A computer-readable storage device having computer-executable instructions, the instructions when executed by a computer performing a method comprising:
   receiving a pipeline of commands, at least one command being capable of receiving at least one input object and outputting at least one output object;
   identifying one method associated with a first pipeline in a command of a plurality of methods by identifying parameters of first pipeline of commands in a catalog;
   executing the identified method to create a data object, the data object having no executable instructions;
   passing the data object to a subsequent command in the pipeline, wherein the subsequent command and the one command method in different processes on a same computing system;
   identifying additional method of a plurality of methods by identifying parameters in a catalog of the subsequent commands in the pipeline; and
   executing the additional method to create an additional data object.

30. The computer-readable storage device of claim 29 wherein the subsequent method and the one method execute on different computing systems.

31. The computer-readable storage device of claim 29 wherein the data object comprises a .NET object.

* * * * *